March 2, 1943.    H. K. KOUYOUMJIAN    2,312,718
SHOCK ABSORBER
Filed April 23, 1941    4 Sheets-Sheet 2
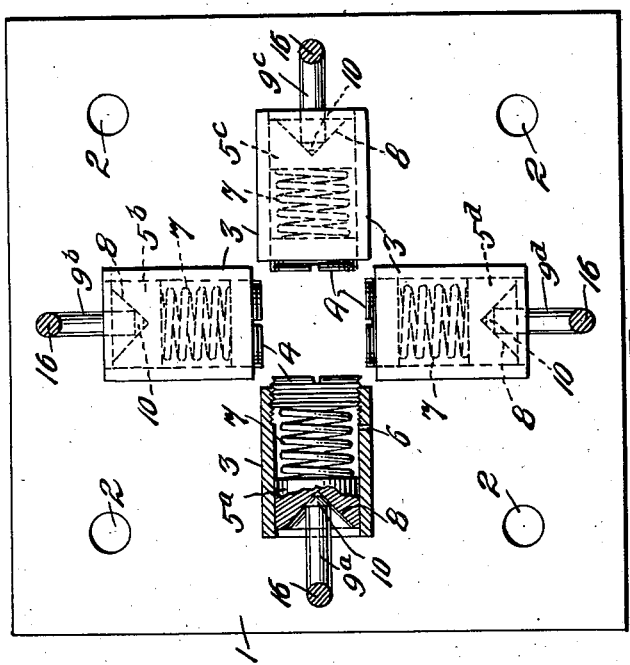
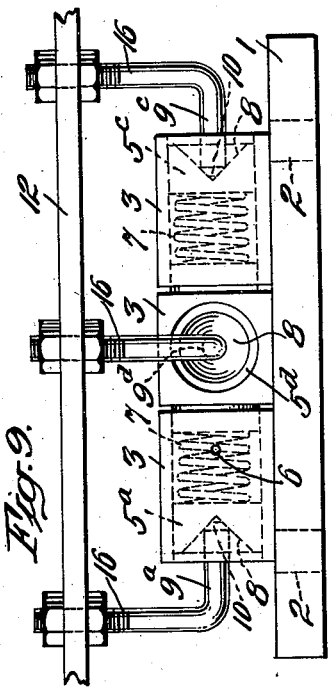
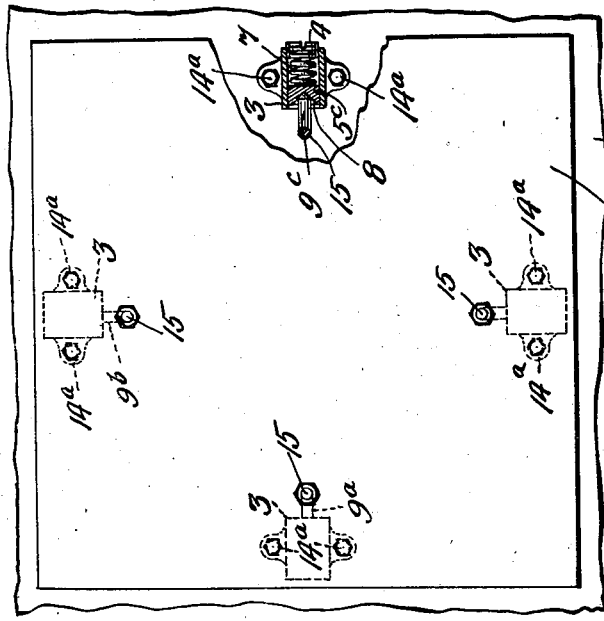
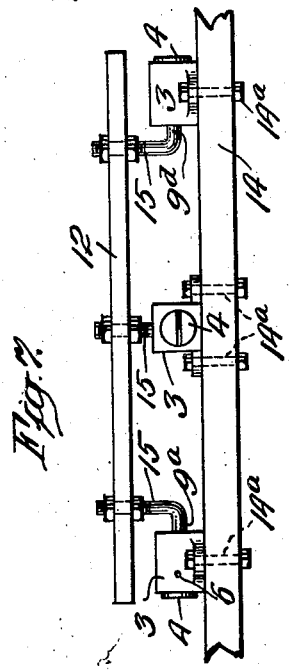
INVENTOR
HAROUTIUM K. KOUYOUMJIAN
BY
Lawrence K. Sager
his ATTORNEY

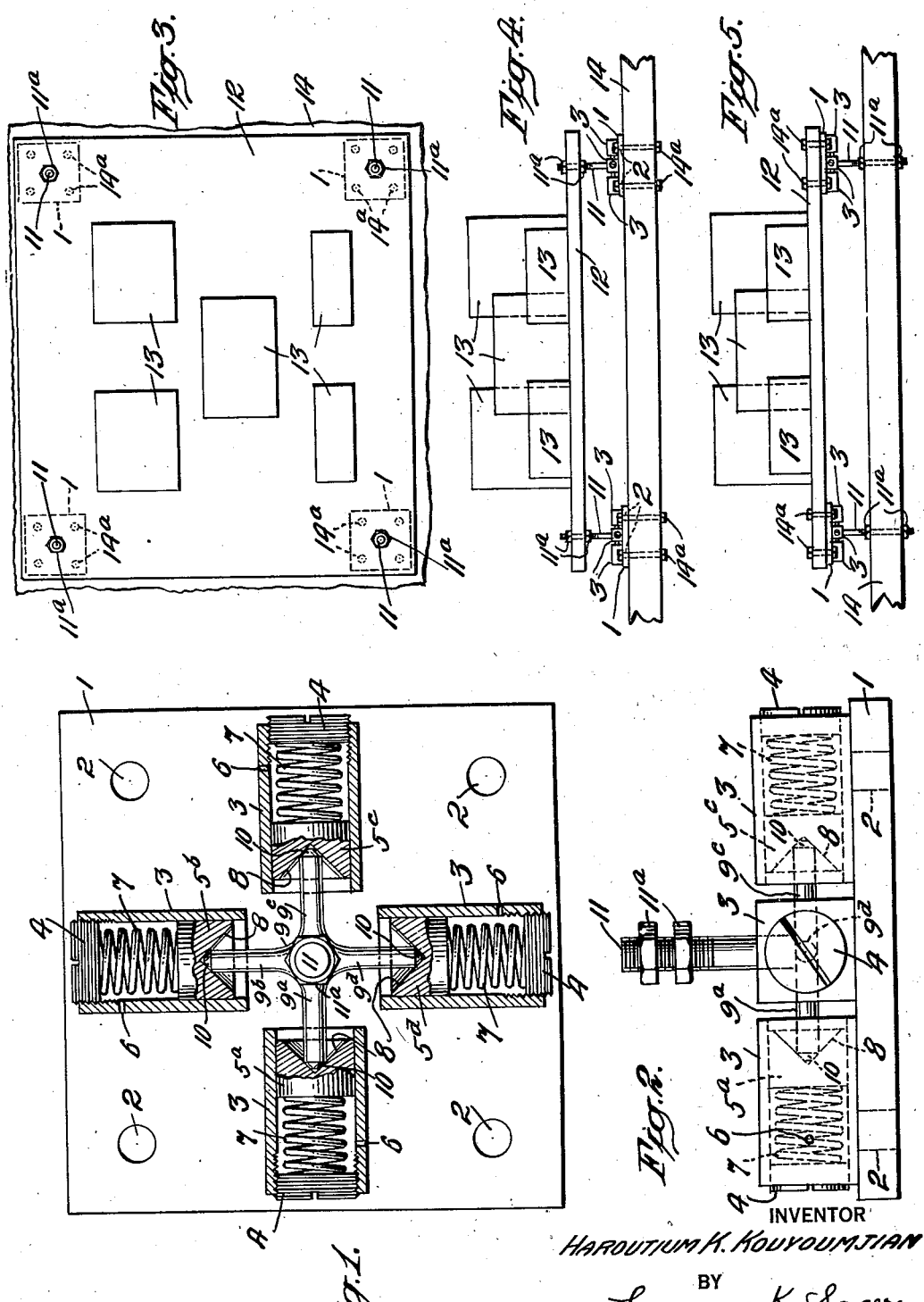

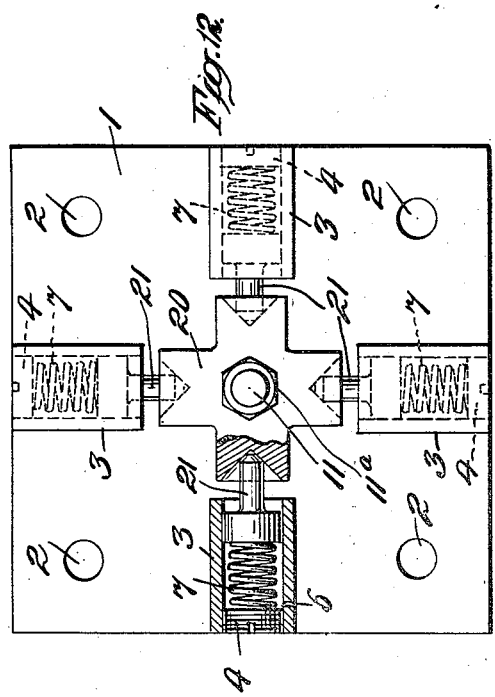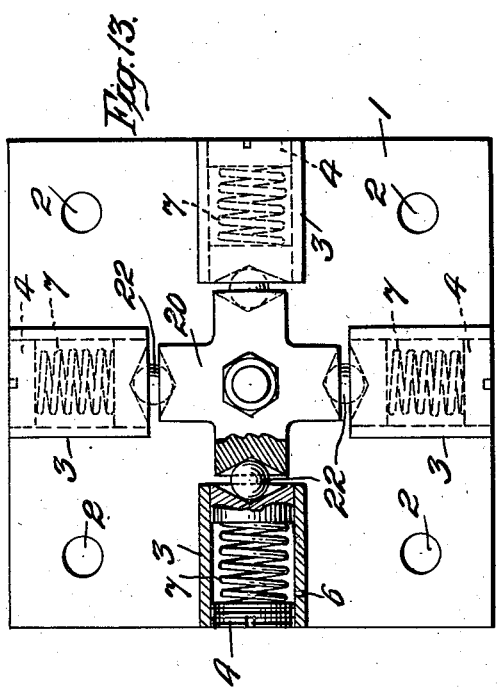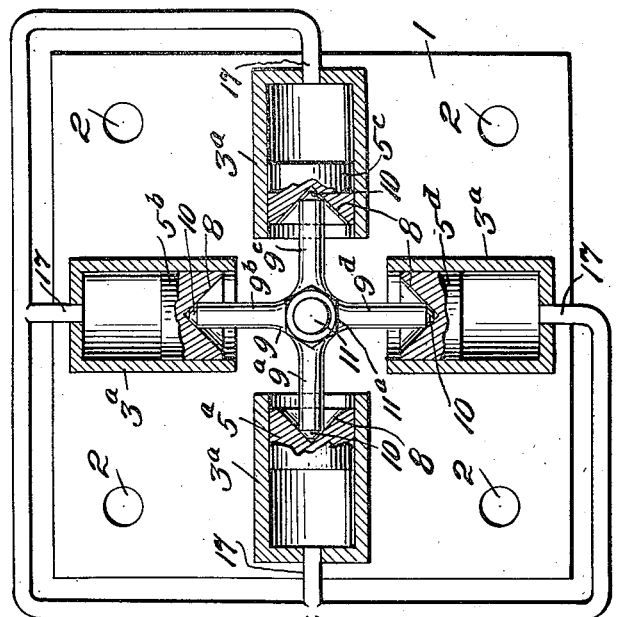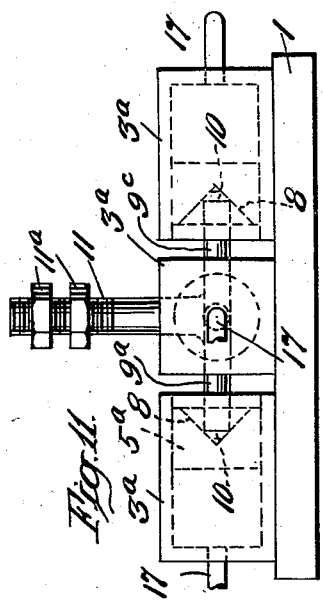

March 2, 1943.   H. K. KOUYOUMJIAN   2,312,718
SHOCK ABSORBER
Filed April 23, 1941   4 Sheets-Sheet 4

INVENTOR
HAROUTIUM K. KOUYOUMJIAN
BY
Lawrence K. Sager
his ATTORNEY

Patented Mar. 2, 1943

2,312,718

UNITED STATES PATENT OFFICE 2,312,718

SHOCK ABSORBER

Haroutium K. Kouyoumjian, Wakefield, R. I.

Application April 23, 1941, Serial No. 389,843

6 Claims. (Cl. 267—1)

This invention is particularly applicable to the support of panels or plates upon which various forms of controlling apparatus are mounted and also to the support of individual devices, such as motors or other devices where an individual support is desirable and to the support of cabinets or rooms containing various apparatus, such as radio reception and transmitting rooms and in general where it is desired to protect devices or an assembly of devices from severe shocks which might otherwise damage the apparatus, or impair its accuracy or efficiency. It is well adapted for use on ships, submarines and aeroplanes for protecting apparatus from severe shocks and jars.

Apparatus which this invention is adapted to protect from severe or unusual shocks or jars, is normally adapted to withstand usual or ambient vibrations in locations where it is to be installed but when subjected to unusual shocks or jars, the apparatus, in its accuracy of response, may be seriously impaired, or result in complete failure to function. The present invention affords protection from shocks above ambient vibrations and wherein the disturbing force exceeds a predetermined amount.

The main object of the invention is to provide an improved form of structure and method of reducing the effect of shocks which will be efficient in protecting apparatus from the effects of shocks. Another object is to provide a structure which will absorb shocks regardless of the direction or plane in which the shock producing force occurs. Another object is to accomplish this purpose by a simple and inexpensive form of construction which will be dependable over long continued use without attention. Another object is to provide an improved form of structure which is generally applicable to the protection of individual units ranging from a small and delicate instrument to very large and heavy devices, or to a collection of devices mounted on a common support, or to a cabinet or room within which various forms of devices and apparatus may be assembled. Another object is to provide an improved structure which may be readily designed as to the character and size of its component parts to meet particular requirements. Other objects and advantages will be understood from the following description and accompanying drawings which disclose various embodiments of the invention.

Figure 14:
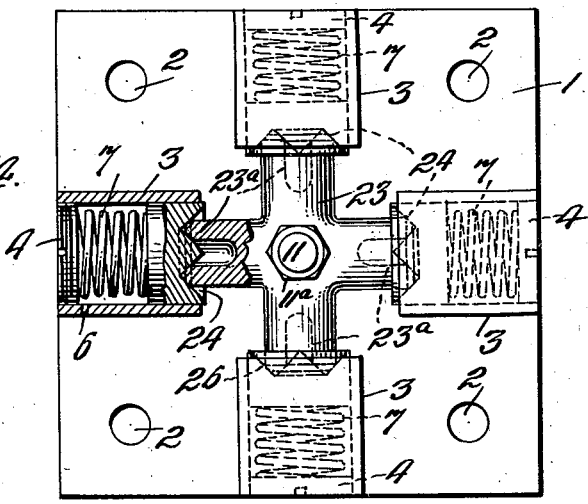
Figure 15:
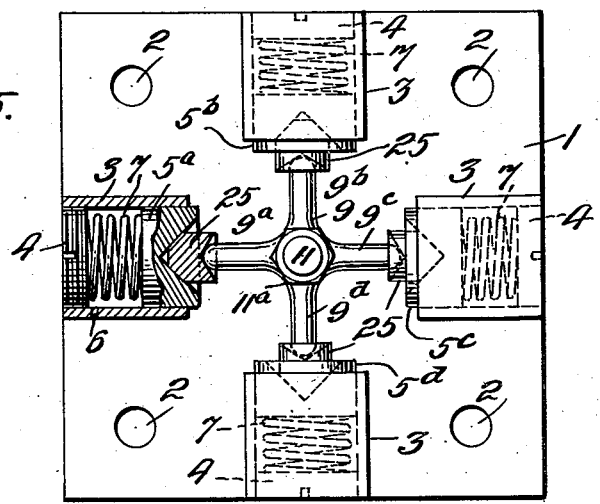
Figure 16:
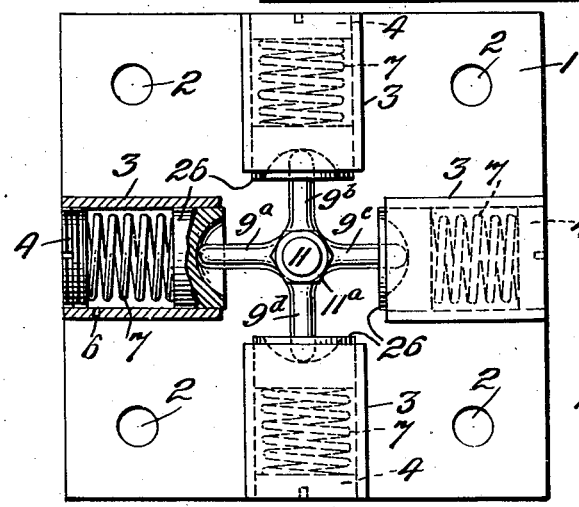

Fig. 1 is a plan view partly in section showing one embodiment of the invention; Fig. 2 is a side view thereof; Fig. 3 is a front view showing a plate supported by four of the units shown in Fig. 1; Fig. 4 is an end view thereof; Fig. 5 is a similar end view showing the parts reversed; Fig. 6 is a plan view showing a simplified form of mounting the parts; Fig. 7 is an end view thereof; Fig. 8 is a plan view partly in section with the parts of the absorber reversed from that of Fig. 1; Fig. 9 is an end view thereof; Fig. 10 is a plan view partly in section wherein gas or air pressure is utilized for opposing shocks; Fig. 11 is an end view thereof; Fig. 12 is a plan view similar to Fig. 1 showing reversal of the frictional engaging surfaces; Fig. 13 is a similar plan view wherein an intermediate element is utilized between the opposing surfaces; Fig. 14 is a similar view wherein the engaging frictional surfaces are multiplied; Fig. 15 is a similar view wherein an intermediate element is utilized having frictional surfaces sustaining angles of different values; and Fig. 16 is a similar view wherein the frictional engaging surfaces are curved.

Referring to Figs. 1 and 2, a plate 1 is shown which is adapted to be secured to the main support which is subject to shock, the bolt holes 2 being provided for that purpose. On the plate 1 is fixed, or united therewith, four elements 3, each having a cylindrical central opening. A pair of these elements are in alignment, each pair being positioned at right-angles to the other pair. These cylinders are closed at their outer ends by adjustable plugs 4 which have threaded engagement with the interior of the outer ends of the cylinders. At the inner end of each cylinder is positioned a slidable element 5a, 5b, 5c and 5d having a sliding fit with the inner ends of the cylinders. Between each slidable element and plug 4 is positioned a spring 7 under compression tending to force the element of each cylinder outwardly from the inner end of the cylinder. The inner faces of the elements 5a to 5d are each provided with a central conical depression or cavity, the sides 8 of which, in a central axial plane, are shown as forming an angle of approximately 90° with each other.

These yieldable elements 5a to 5d support a floating central element 9 which is provided with four arms 9a, 9b, 9c and 9d which respectively engage the conical surfaces 8 at their outer ends. The outer end of each arm is cone-shaped, the sides 10 of which are given the same angular relation as the conical cavity of the elements 5a to 5d so as to fit therein. From the central portion of the floating element 9 is an upward extension forming a bolt 11 which may be provided with nuts 11a for supporting the device which is to be protected from shock.

When the plate 1 is subjected to minor jars below a predetermined value, such as ambient vibrations, the device has no shock absorbing effect, such vibrations being transmitted directly from the plate 1 to the element 9 and the part or parts supported thereby. But when the plate 1 is subjected to shocks exceeding such value, the device will greatly reduce the shock transmitted to the floating element 9, the percentage of reduction of shock depending upon the design of the parts and various influencing factors. First consider a shock imposed upon the plate 1 from the right to the left of Fig. 1: if the force of the shock exceeds a predetermined value, it will cause the surfaces at the ends of arms 9b and 9d to exert pressure on the right-hand portions of the surfaces 8 of the upper and lower elements 5b and 5d. This results in forcing these elements against the pressure of their springs and the ends of the arms 9b and 9d will ride up on the right-hand portions of the surfaces 8 of the elements 5b and 5d to an extent depending upon the degree of shock. It thereby cushions the force of the shock and transmits to the device or other parts supported by the floating element 9, a greatly decreased impulse and thus relieves such device or other parts from the severity of the shock. In case the shock was imposed upon the plate 1 in a direction from left to right, the reverse action would take place.

In case the shock was transmitted to the plate 1 in a direction from the lower portion of the figure to the upper portion, the arms 9a and 9c of the floating element would ride up on the lower surfaces 8 of the elements 5a and 5c and thereby cushion the shock imposed from that direction. In case the shock was transmitted from the upper portion of Fig. 1 towards the lower portion, the reverse action would take place by the surfaces of the arms 9a and 9c riding up on the opposite sides of the elements 5a and 5c. In case the shock was transmitted to the plate 1 downwardly in a direction at right-angles to the plate, all four arms of the floating elements would ride upwardly on the conical surfaces 8 forcing all four elements 5a to 5d outwardly to an extent depending upon the amount of the shock and thereby protect the part or parts carried by the floating element. In case of a shock against the under side of the plate 1 upwardly, the reverse action will take place. In case a shock was transmitted in any other plane or planes in any direction, the cushioning effect would result in a composite action of the arms of the floating element and the movable elements 5a to 5d and thereby compensate for the shock received from any direction. After each shock, the floating element 9 is restored to its normal central position in readiness for the reception and cushioning of further shocks; but even if a rapid succession of shocks occurs before return to normal position, the apparatus will function in the manner already described to cushion the effect of each shock by further displacement from any existing position.

An advantage of the invention resides in preventing the protected devices or parts from coming into resonance with minor vibrations. This is due to the fact that for all forces below a certain predetermined value, such as those due to ambient vibrations, the shock absorber acts as a rigid body as a whole. Thus there is no opportunity for imposing objectionable pronounced resonant effects on the protected device arising from minor vibrations, as occurs in the case of the usual spring or rubber mountings.

There are a number of factors which determine the value of the applied force, below which no cushioning action occurs and also the percentage of shock absorption when the applied forces exceed such a value. Likewise the design of the parts may be varied to conform to any particular requirements as to the character of the device or devices to be protected and to their size or weight.

For example, the springs 7 may be varied in size, length, or diameter and may be varied in form, such as spiral, for determining the change of opposing force exerted by the springs upon increasing displacement of the slidable elements. Likewise the springs may be light and easily compressed or may be heavy and stiff to exert a strong opposing force against the floating element. Likewise the opposing force to displacement of the floating element may be varied by adjustment of the plugs 4 which also serve to give an initial compression of the spring. The inclination of the surfaces 8 of the slidable elements and of the surfaces 10 of the floating element may be varied for affecting the degree of opposition to displacement of the slidable elements, the more acute this angle is made the greater the opposition to displacement of the slidable elements. Likewise the finish of the contacting surfaces between the cones of the floating element and the cavities of the slidable elements affects the displacement, as this varies the static friction and sliding friction of these surfaces. Furthermore the friction of the parts may be changed by oiling or greasing the contacting surfaces and the material of the engaging parts should be made of rust-proof metal, such as stainless steel or hard copper alloys. Another factor capable of variation is the degree of finish between the cylindrical surfaces of the slidable elements and the interior walls of the cylinders and whether or not these surfaces are oiled or greased. A further factor capable of variation is the closeness or looseness of fit between these slidable elements and the interior walls of the cylinders because, aside from the friction of these parts, there is an air cushioning effect within the cylinders which cooperates with the spring to oppose displacement of the slidable elements; and this cushioning effect may be varied by the closeness of fit between the slidable elements and the cylinders. In fact a vent 6 in the form of a small hole through each cylinder wall may be provided, if desired, for affecting the air cushioning effect, the size of the hole and its location being varied to suit particular requirements.

Figs. 3 and 4 show one way of mounting a plate 12 carrying several devices 13 which it is desired to protect from shock. The main plate 14 is indicated as being subject to shocks from various directions and upon this plate at four different places are secured the plates 1 by means of the bolts 14a passing through the holes 2 of the plates. The four rods 11 from each of the floating elements are shown as passing through the plate 12 which is bolted to them. It is apparent from the description with reference to Figs. 1 and 2 that the plate 12 and devices and apparatus carried thereby will be protected from the effects of severe shocks imparted upon the main support 14. Any number of these shock absorbers may be introduced between the support 14 and the plate 12 and variously located according to particular requirements.

In some cases, instead of using a plurality of the units shown in Fig. 1 for supporting the device or devices to be protected, only one such unit may be used and the device supported on one rod 11, or may rest directly upon and be fastened to the floating element 9. Also if the shocks to be protected against come from only a limited number of directions, only one pair of cylinders 3 and slidable elements may be used, the alignment of the same being at right-angles to the general direction of the shocks.

The mounting shown in Fig. 5 is similar to that of Figs. 3 and 4 except that the supporting units are reversed. In Fig. 5 the rods 11 are bolted to the main support 14 while the plates 1 are bolted to the under side of the plate 12.

Figs. 6 and 7 show a further modification wherein the plate 12 which supports the devices to be protected, is supported at displaced points directly by the arms 9a to 9d, outward extensions 15 of these arms being provided which in turn are bolted to the plate 12.

Figs. 8 and 9 show a further modification of the structure shown in Fig. 1 wherein certain parts are reversed. Here the cylinders 3 secured to the plate 1 are reversed in direction, the ends having the adjustable plugs 4 being near the center of the plate while the slidable elements 5a to 5d are at the outwardly extending ends of the cylinders. The arms 9a to 9d which respectively center within the elements 5a to 5d extend outwardly and are provided with extensions 16 at right-angles thereto which in turn support the plate 12 on which the devices to be protected are mounted.

Instead of using the springs 7 for opposing the movement of the slidable elements, other yieldable means may be provided and Figs. 10 and 11 show a modification wherein a gas or air is depended upon alone for this purpose. In these figures the parts correspond generally in their relationship to those shown in Figs. 1 and 2 but the springs 7 are omitted and the cylinders 3a are closed at their outer ends except for openings to receive pipe connections 17 which are connected together and through a bleeder valve 18 to a pressure tank 19. The pressure in this tank will be maintained at a fixed value which will be determined by the amount of opposition to be normally imposed against the ends of the slidable elements. According to particular requirements, of course, this pressure may be changed from time to time to meet changed conditions. The passage of the gas or air through the bleeder valve will be sufficient to compensate for leakage to atmosphere around the slidable elements so as to maintain a normally constant pressure at the back of them. Upon the reception of shocks and the small or large displacement of the slidable elements according to the amount of the shock, the pressure back of the elements so moved will increase accordingly and give increasing opposition the more the elements are displaced because the bleeder valve will not be opened sufficiently to permit the pressure tank to absorb the sudden increase of pressure in the cylinders. And upon the cessation of the shock, the floating element and displaced slidable elements will be restored to their normal positions and the pressure in the tank will then insure the maintaining of normal pressure back of the slidable elements.

Fig. 12 is similar to Fig. 1 except instead of forming the conical cavities in the slidable elements, the cavities are formed on projecting portions of the floating element 20 of Fig. 12; and the projecting arms 9a to 9d of Fig. 1 are replaced by projecting rods 21 extending from the slidable elements, the rods having conical surfaces which engage the cavities of the floating element 20. The operation would be similar to that already described.

Fig. 13 is similar to Fig. 12 except both the slidable elements and the floating element 20 are provided with conical cavities in opposition to each other and in between them are respectively inserted balls or spheres 22. Instead of the cavities being conical in shape they may be of spherical form of larger diameter than the balls 22 or they may be elliptical or curved in any manner to suit particular requirements. The operation is similar to that already described, although there is less friction between opposing parts.

In Fig. 14 the structure is similar to that of Fig. 1 except the extending arms 23 of the floating element instead of carrying cone-shaped surfaces, carry concentric rings 23a, the faces of which are V-shaped or rounded. These rings each fit into a corresponding concentric groove 24 of V form provided on the inner face of each slidable element. The operation is similar to that already described.

Fig. 15 is similar to the structure shown in Fig. 1 except an auxiliary element 25 is interposed respectively between each slidable element and the end of each arm of the floating element 9. Each of these elements 25 is provided on its outer face with a surface which engages the cavity of its respective slidable element and on its inner face with a cavity in which is seated an end of its respective arm of the floating element. Here the conical cavity of each slidable element is shown as sub-tending an angle of 90° while the conical cavity at the inner end of the element 25 is shown sub-tending an angle of 120°. In this embodiment minor shocks will be cushioned by the floating element being depressed with reference to the intermediate members 25 and major shocks will cause displacement of the elements 25 with reference to the slidable elements 5a to 5d, or a combined action with reference to both pairs of engaging surfaces.

Fig. 16 is similar to Fig. 1 except the cavities in the slidable elements 26 instead of being conical are of curved-shape and may be spherical, elliptical, hyperbolic or of other curved formation. Similarly the ends of the arms of the floating element may be variously curved to suit particular requirements. The operation is similar to that already described, the displacement from normal positions tending to force the slidable elements against the pressure of their springs. The shape of the curved cavity of the slidable elements, or the steepness of the curve from the center towards the circumference of the slidable elements will determine the degree of resistance with increasing displacement of the slidable elements.

An important feature of this invention is the fact that the weight of the devices, panels or parts supported by the floating element is not borne by the springs or the other means exerting force against the slidable elements; that is, the weight of the parts is carried mainly by the frictional contact surfaces, the springs or other yieldable means serving to oppose relative movement. This applies regardless of the vertical, horizontal or other angular mounting of the panel or parts. A further feature of importance is that the springs, by reason of not being subjected to the effects of ambient vibrations, are not subject to failure due to fatigue and thereby exert their initially given force over long periods of time without replacement. A further advantage results from the fact that because of the parts being protected from severe shock intensities, the weight of the supported panel and of the devices on the panel can be reduced, as well as their size, as they then require less strength.

Although various embodiments and modifications of the invention have been shown and described, it will be apparent that many other modifications may be made without departing from the scope of the invention.

I claim:

1. A shock absorber adapted for connection between relatively movable parts comprising more than two sets of relatively movable elements, one of the elements of each set being yieldably mounted on one of said parts and one of the elements of each set being secured to the other of said parts and acted upon by the other elements of each set respectively for normally holding them in a central position, certain of the elements of each set having cavities formed therein with the wall of each of said cavities diverging from its center forming a continuous curved surface in a circumferential direction about the central axis of the cavity for permitting relative displacement of elements of each set from the central position along the walls of said cavities under shocks, and certain of said sets being angularly positioned with reference to other of said sets.

2. A shock absorber adapted for connection between relatively movable parts comprising more than two sets of relatively movable elements, one of the elements of each set being yieldably mounted on one of said parts and one of the elements of each set being secured to the other of said parts and acted upon by the other elements of each set respectively for normally holding them in a central position, certain of the elements of each set having cavities formed therein with the wall of each of said cavities diverging from its center forming a continuous curved surface in a circumferential direction about the central axis of the cavity for permitting relative displacement of elements of each set from the central position along the walls of said cavities under shocks, and each of said sets being angularly positioned about a common center with reference to its adjoining sets.

3. A shock absorber adapted for connection between relatively movable parts comprising more than two sets of relatively movable elements, one of the elements of each set being yieldably mounted on one of said parts and one of the elements of each set being secured to the other of said parts and acted upon by the other elements of each set respectively for normally holding them in a central position, certain of the elements of each set having cavities formed therein with the wall of each of said cavities diverging from its center forming a continuous curved surface in a circumferential direction about the central axis of the cavity for permitting relative displacement of elements of each set from the central position along the walls of said cavities under shocks, and said sets being positioned in pairs in angular relation to each other and the sets of each pair being in alignment with each other.

4. A shock absorber adapted for connection between relatively movable parts comprising four sets of relatively movable elements, one of the elements of each set being yieldably mounted on one of said parts and one of the elements of each set being secured to the other of said parts and acted upon by the other elements of each set respectively for normally holding them in a central position, certain of the elements of each set having cavities formed therein with the wall of each of said cavities diverging from its center forming a continuous curved surface in a circumferential direction about the central axis of the cavity for permitting relative displacement of elements of each set from the central position along the wall of said cavities under shocks, and said sets being positioned in two pairs approximately at right-angles to each other and the sets of each pair being approximately in alignment with each other.

5. A shock absorber adapted for connection between relatively movable parts comprising more than two sets of relatively movable elements, a guide for one of the elements of each set respectively, said guides being fixed to one of said parts, yieldable means for each of said last named elements respectively for forcing its respective element in one direction in its guide, one of the elements of each set being fixed to the other of said parts and acted upon by the guided elements of the sets respectively for normally holding them in a central position, certain of the elements of each set having cavities formed therein with the wall of each of said cavities diverging from its center forming a continuous curved surface in a circumferential direction about the central axis of the cavity for permitting relative displacement of elements of each set from the central position along the walls of said cavities under shocks, and certain of said sets being angularly positioned with reference to other of said sets.

6. A shock absorber adapted for connection between relatively movable parts comprising more than two sets of relatively movable elements, one of the elements of each set being yieldably mounted on one of said parts and one of the elements of each set being secured to the other of said parts and acted upon by the other elements of each set respectively for normally holding them in a central position, certain of the elements of each set having conical cavities formed therein with the wall of each of said cavities diverging from its center forming a continuous curved surface in a circumferential direction about the central axis of the cavity for permitting relative displacement of elements of each set from the central position along the walls of said cavities under shocks, and certain of said sets being angularly positioned with reference to other of said sets.

HAROUTIUM K. KOUYOUMJIAN.